United States Patent
Perello et al.

(10) Patent No.: US 6,974,138 B2
(45) Date of Patent: Dec. 13, 2005

(54) ELECTRONICALLY CONTROLLED SUSPENSION FOR MOTOR VEHICLES

(75) Inventors: Gian Luigi Perello, Torano (IT); Silvano Sandri, Cuneo (IT)

(73) Assignee: C.R.F. Societá Consortile per Azioni, Orbassano Turin (IT)

( * ) Notice: Subject to any disclaimer, the term of this patent is extended or adjusted under 35 U.S.C. 154(b) by 164 days.

(21) Appl. No.: 10/673,019

(22) Filed: Sep. 26, 2003

(65) Prior Publication Data

US 2004/0140642 A1 Jul. 22, 2004

Related U.S. Application Data

(63) Continuation-in-part of application No. 09/892,302, filed on Jun. 26, 2001, now abandoned.

(30) Foreign Application Priority Data

Jun. 27, 2000 (IT) .......................... TO2000A0627

(51) Int. Cl.[7] .......................... B60G 3/01; B62D 5/04; B62D 6/00; B62D 17/00
(52) U.S. Cl. .......................... 280/5.522; 280/124.127; 280/124.154; 280/93.512; 180/402; 180/444; 180/446
(58) Field of Search .......................... 280/5.522, 5.52, 280/86.758, 86.75, 124.127, 124.154, 124.145, 280/124.146, 93.504, 93.51, 93.512; 180/402, 180/444, 446, 443, 412, 413

(56) References Cited

U.S. PATENT DOCUMENTS

| 1,842,273 | A | 1/1932 | Lancia |
| 2,220,254 | A | 11/1940 | Maier |
| 4,741,516 | A | 5/1988 | Davis |
| 4,811,969 | A | 3/1989 | Sugiyama |
| 5,143,400 | A | 9/1992 | Miller et al. |
| 5,195,601 | A | 3/1993 | Voigt et al. |
| 5,438,515 | A | 8/1995 | Miichi et al. |
| 6,176,341 | B1 | 1/2001 | Ansari |

FOREIGN PATENT DOCUMENTS

| FR | 2515580 | 5/1983 |
| GB | 453808 | 9/1936 |
| GB | 658291 | 10/1951 |
| JP | 03109139 | 5/1991 |

*Primary Examiner*—Peter C. English
(74) *Attorney, Agent, or Firm*—TraskBritt

(57) ABSTRACT

Independent wheel suspension for motor vehicles comprising: a wheel support (12) with a suspension movement and a steering movement, suspension movement guide devices including a steering element (16), elastic device (34) and shock absorbing devices (16, 26), and a control device (42, 44, 46, 40) of the wheel support steering movement. The wheel support (12) slides along steering element (16), which is slanted with respect to a vertical axis, and the steering movement control device comprises an electric actuator (42) controlled by an electronic control unit (50) arranged to correct the steering movements induced by the suspension movement.

4 Claims, 4 Drawing Sheets

ELECTRONICALLY CONTROLLED SUSPENSION FOR MOTOR VEHICLES

CROSS-REFERENCE TO RELATED APPLICATION

This application is a continuation-in-part of application Ser. No. 09/892,302, filed Jun. 26, 2001, now abandoned.

BACKGROUND OF THE INVENTION

This invention relates to an independent wheel suspension for motor vehicles.

A common problem for all suspension systems for steering wheels of motor vehicles is that the suspension movement of the wheel induces undesired steering. The kinematic solutions for controlling the variations of the toe-in angle of the wheel induced by the suspension movement are generally rather complex and costly, both in terms of the number of components and the complexity of the vehicle assembly operations. An additional problem consists in that the suspensions permitting a better control of the toe-in variation induced by the suspension movement (for example, transversal quadrilateral suspensions) are often very cumbersome in the transversal direction and cause an increase in transversal dimensions of the vehicle, especially in the case of vehicles with the engine arranged transversally.

Purpose of this invention is to provide a suspension for motor vehicles which solves said problems. An additional purpose of this invention is to provide a suspension system which consists of a reduced number of components and which can totally be preassembled off the vehicle assembly line.

According to this invention, these purposes are attained by means of a suspension which characteristics are described herein.

BRIEF DESCRIPTION OF THE SEVERAL VIEWS OF THE DRAWINGS

This invention will be better explained by the following detailed descriptions with reference to the accompanying drawings, given as non-limiting example, wherein:

FIG. 5 is a schematic cross-section according to line V—V in FIG. 1, and.

DETAILED DESCRIPTION OF THE INVENTION

With reference to the figures, numeral 10 indicates an independent wheel suspension for steering wheels of a motor vehicle. Suspension 10 comprises a wheel support 12 on which a wheel 14 turns.

Figure 3:
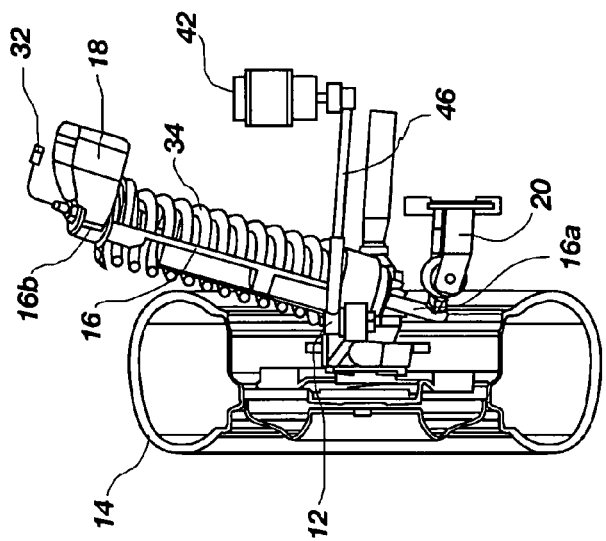
FIGS. 2, 3 and 4 are schematic views according to arrows II, III and IV in FIG. 1 respectively.
Figure 2:
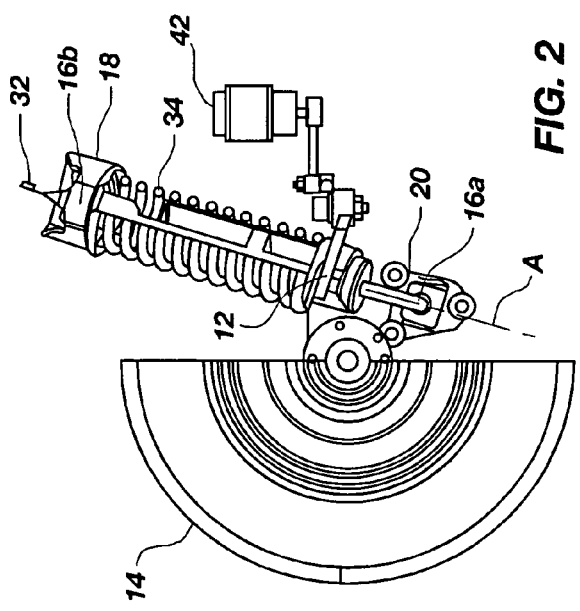
Figure 4:
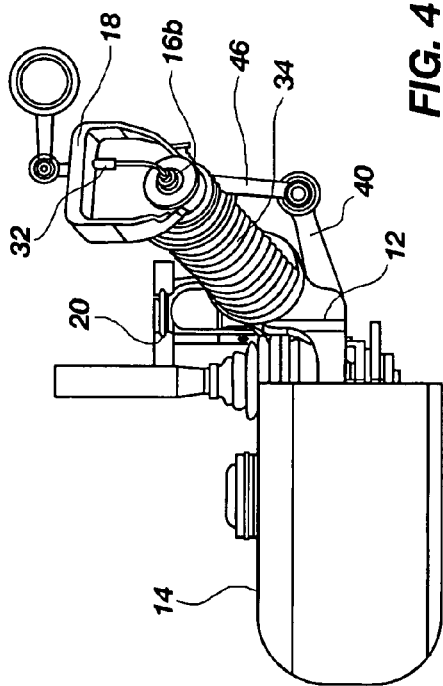
Figure 5:
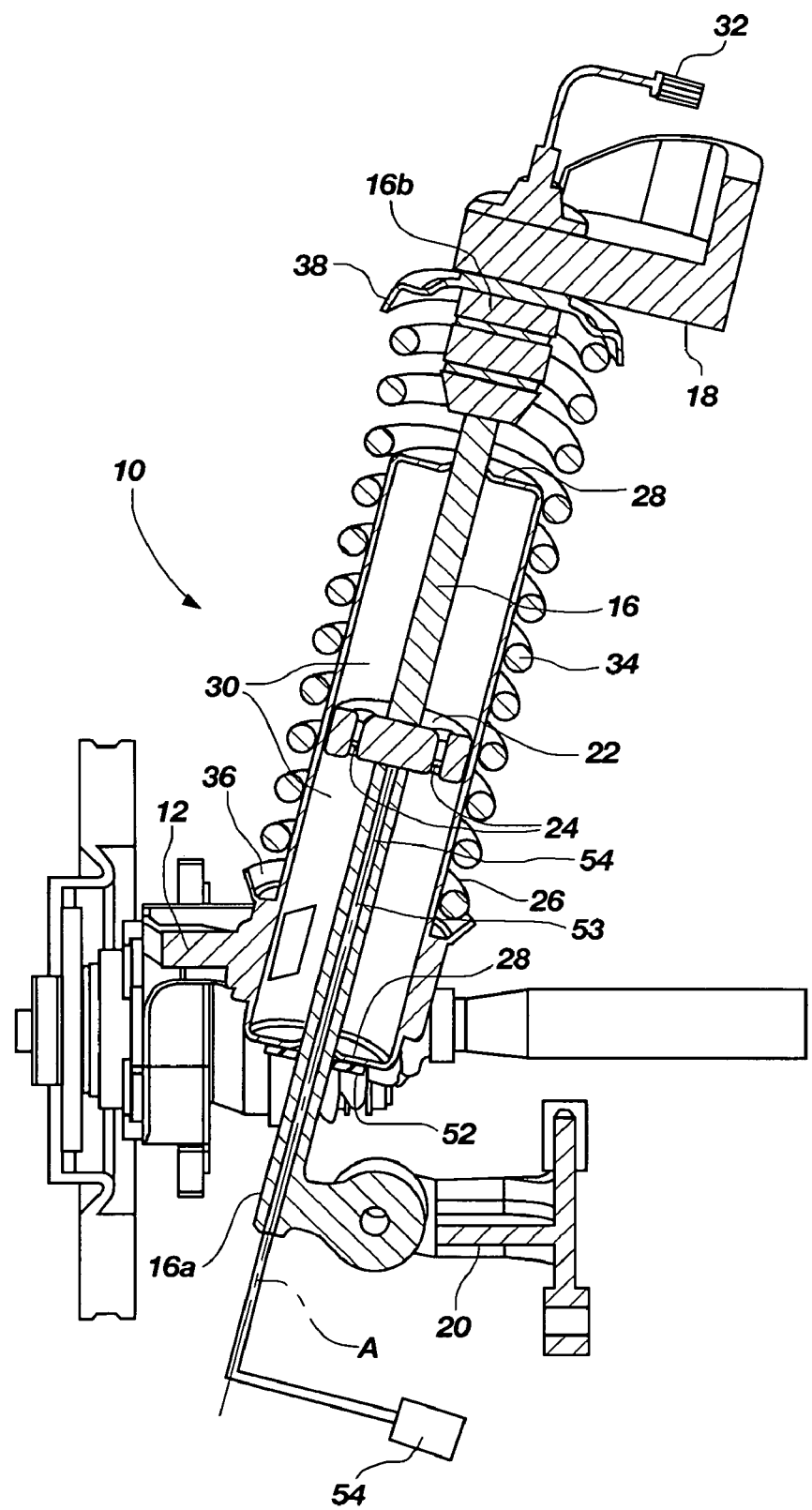
Figure 6:
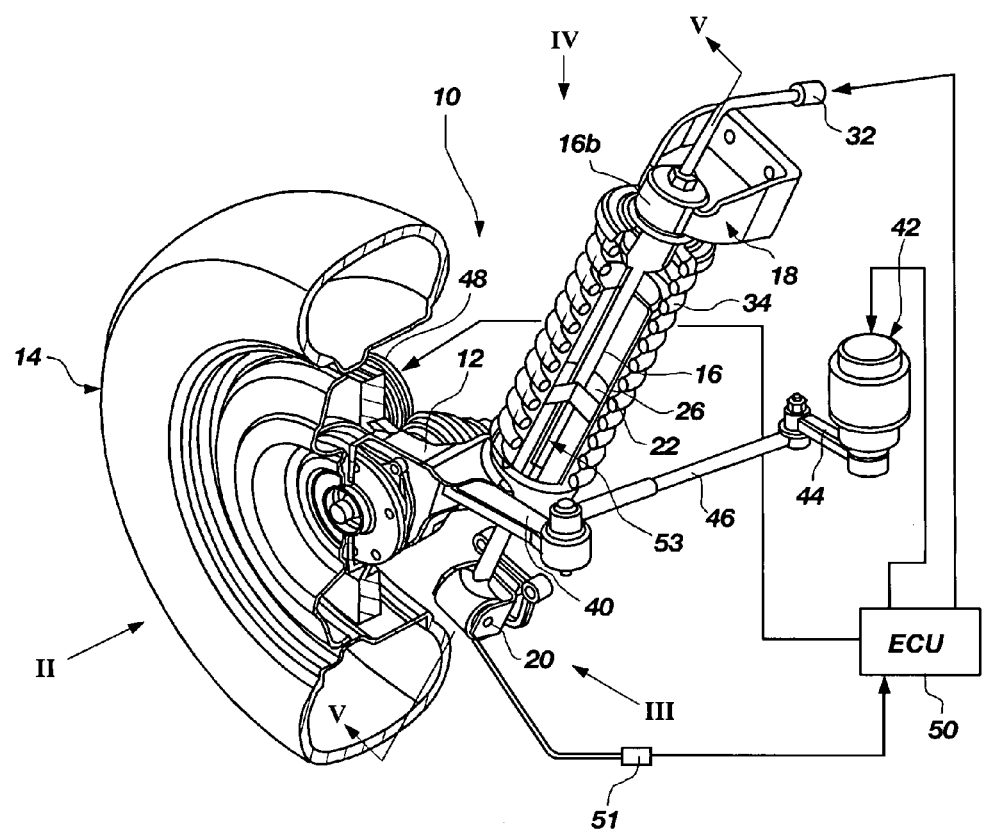
FIG. 6 is a schematic perspective view of the suspension.

As shown in greater detail in FIG. 5, suspension 10 comprises a steering arm 16, preferably straight, with fastening elements 18, 20 connected to the respective extremities destined to be fastened to the body of a motor vehicle (not illustrated). When suspension 10 is fitted on a motor vehicle, the steering arm 16 is fixed with respect to the body of the motor vehicle. In the assembled condition on the motor vehicle, the longitudinal axis A of the steering arm 16 is slanted with respect to a vertical axis. The axis A is slanted both on a longitudinal vertical plane and on a transversal vertical plane. As shown in FIGS. 2, 3 and 4, the lower extremity 16a of the steering arm 16 is moved forward and outwards with respect to the upper extremity 16b.

With reference to FIG. 5, a piston 22 is fastened to the steering arm 16 and presents one or more longitudinal apertures 24 for the passage of damping fluid. The wheel support 12 is fastened to a tubular element 26 arranged coaxially with respect to the steering arm 16 and slides with respect to the latter in the longitudinal direction A. The tubular element 26 presents closed extremities 28, which engage and hold the steering arm 16. The tubular element 26 defines two chambers 30, arranged on opposite sides with respect to the piston 22, and filled with a damping fluid. Consequently, the tubular element 26 forms the external casing of a shock absorber. The wheel support 12, which is integral with the tubular element 26 is free to undergo suspension movement in the direction of axis A and steering movement consisting of an oscillation around the axis A. According to a particularly advantageous form of embodiment of this invention, the damping characteristics of the shock absorber formed by the steering arm 16, the piston 22 and the tubular casing 26 can be controlled electronically. This can be obtained, in a way which is known, using a damping fluid with magnetic-rheological qualities or by arranging electronically controlled valves in the fluid passage apertures 24. In FIG. 5, numeral 32 schematically indicates an electric connector for providing electric damping characteristic control signals to the shock absorber.

An elastic element 34, consisting for example of a compressed coil spring, is arranged in coaxial position around the tubular element 26. The lower extremity of the elastic element 34 rests on a plate 36 fastened to the wheel support 12. The upper extremity of the elastic element 34 rests on a plate 38 fastened to the upper extremity 16b of the steering arm 16.

The wheel support 12 is fastened to a steering lever 40, which is operated by an electric actuator 42, destined to be fastened to the body of the motor vehicle. In the form of embodiment illustrated in the figures, the actuator 42 is rotary. A linkage 44, controlling the steering lever 40 via a connecting rod 46, is connected to the output shaft of the actuator. The electric actuator 42 is capable of controlling the rotation movement of the wheel support 12 around axis A, which amplitude is correlated to the rotation of the steering wheel of the motor vehicle. Each steering wheel is equipped with an electric actuator 42, reason for which no mechanical interconnection between the two steering wheels on the two sides of the vehicle is required.

Figure 1:
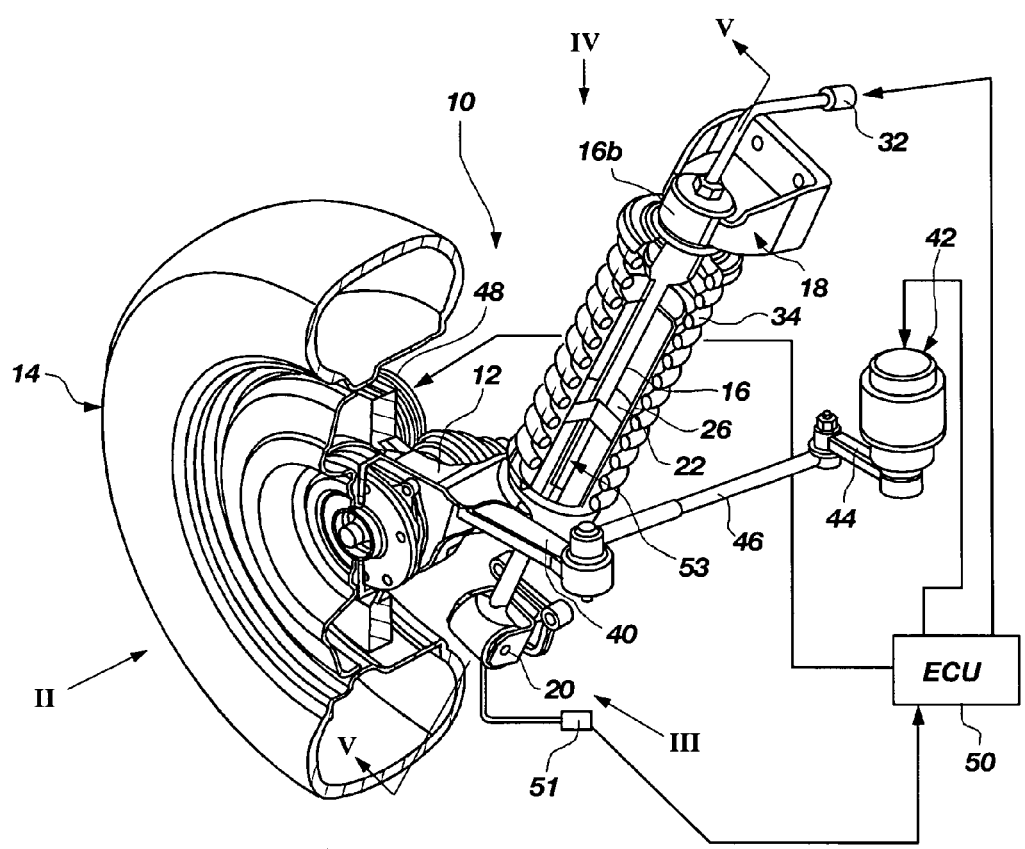
FIG. 1 is a schematic perspective view of a suspension according to this invention.

The suspension according to this invention is preferably equipped with an electrically controlled braking device 48, which can be of any known type. As schematically illustrated in FIG. 1, an electronic control unit 50 sends electric control signals to the electric actuator 42, to the shock absorber 16, 26 and to the electromechanical brake 48.

The suspension movement of the wheel 14 with respect to the body of the vehicle is a straight movement along the direction of the slanted axis A. Considering that the direction of movement of the suspension is slanted with respect to the suspension of the wheel, if the actuator 42 remained still during the suspension movement of the wheel, the wheel toe-in angle would vary, induced by the suspension movement of the wheel. This toe-in angle variation would produce undesired steering of the wheel. In order to overcome this problem, according to this invention, the electronic control unit 50 is arranged to control the electric actuator 42 so to correct the undesired toe-in angle variations related to the movement of the suspension. Under this arrangement, each position of the wheel support 12 with respect to the shock absorber 16, 26 corresponds to a determined steering angle. The memory of the control unit contains tables indicating the correlation between steering angle and wheel support position. For each position of wheel support 12, the control unit 50 compares the steering due to the configuration of the suspension with a desired value, also residing in the memory of the control unit (for instance, in the form of tables), and controls the steering actuator 42 so as to compensate for the difference between the actual steering angle and the desired steering angle. For this purpose, the electronic control unit 50 receives a signal indicating the position of the wheel support 12 with respect to axis A and, according to this function, computes the correction angle required to compensate for the change in the toe-in angle, whereby controlling the electric actuator 42 so to impose a steering angle equal and opposite to the movement of the wheel support 12 along axis A to the wheel support 12. The position signal sent to control unit 50 may be provided by conventional sensors that are capable of measuring the displacement of wheel support 12 along axis A. In one embodiment of the invention the position of the wheel is detected by a sensor 53 integrated into the shock absorber 16. One suitable type of sensor, for example, is a contactless magnetic sensor commercially available under the product name "PLCD" from Tyco Electronics. This particular type of sensor is a linear position sensor which includes a coil 54 inserted into the shaft of the shock absorber 16 and a permanent magnet 52 carried by the body 26 and being moveable therewith. Connector 51 is connected to the coil 54 of the sensor.

Furthermore, the electronic control unit 50 can be arranged to receive signals indicating the longitudinal and transversal acceleration of the vehicle and to control the damping characteristics of the shock absorber according to said signals, to control rolling and pitch of the vehicle. Furthermore, the electronic control unit 50 controls the braking device 48 and the steering actuator 42 according to the braking and steering controls of the vehicle driver by means of the brake pedal and the steering wheel.

The suspension according to this invention can be used without substantial changes for front and rear wheels and for both driving and idle wheels. The suspension according to this invention permits setting steering control in an individual way on the individual wheels for obtaining ideal steering from a kinematic point of view, without the constraints deriving from the steering mechanism. Also the shock absorber damping and the braking control strategies can be controlled individually on each wheel. In addition to a particularly reduced transversal size, the suspension according to this invention is also characterized by reduced size in the vertical direction, because the vertical size of the suspension depends only on the maximum amplitude of the suspension and is not conditioned by the kinematic structure of the wheel suspension mechanism.

What is claimed is:

1. An independent wheel suspension for motor vehicles comprising:
    a wheel support with a suspension movement and a steering movement,
    suspension movement guiding devices including a steering element which guides the suspension movement, the steering element forming part of a shock absorbing device and being coupled to an elastic device, and
    a control device of the wheel support steering movement, wherein the wheel support slides along the steering element, which is slanted with respect to a vertical axis, and wherein the steering movement control device comprises an electric actuator controlled by an electronic control unit arranged to correct steering movements induced by the suspension movement based on a signal indicating a position of the wheel support along an axis of the steering element.

2. A motor vehicle comprising at least one steerable wheel, wherein the at least one steerable wheel is supported by an independent wheel suspension as defined in claim 1.

3. The suspension according to claim 1, wherein said steering element comprises a straight rod having extremities equipped with attachment devices for fastening to a body of a motor vehicle.

4. The suspension according to claim 3, wherein the wheel support is fastened to a tubular element sliding with respect to the steering element and forming an external casing of the shock absorbing device.

* * * * *